United States Patent [19]

Yokouchi

[11] Patent Number: 4,701,888
[45] Date of Patent: Oct. 20, 1987

[54] DATA BUS DISCHARGING CIRCUIT
[75] Inventor: Hiroshi Yokouchi, Tokyo, Japan
[73] Assignee: Oki Electric Industry Co., Ltd., Tokyo, Japan
[21] Appl. No.: 772,943
[22] Filed: Sep. 5, 1985
[30] Foreign Application Priority Data
Sep. 6, 1984 [JP] Japan ............... 59-185379
[51] Int. Cl.⁴ .................................. G11C 11/40
[52] U.S. Cl. ................................. 365/203; 364/900
[58] Field of Search ............... 364/200, 900; 370/85; 375/36; 365/226, 203, 202, 190, 230, 189, 207, 233, 205, 193; 307/241, 355, 270

[56] References Cited

U.S. PATENT DOCUMENTS

| 3,938,094 | 2/1976 | Caudel | 364/200 |
|---|---|---|---|
| 3,967,252 | 6/1976 | Donnelly | 364/205 |
| 3,969,706 | 7/1976 | Proebsting et al. | 365/189 |
| 4,063,118 | 12/1977 | Nishimura | 307/270 |
| 4,216,389 | 8/1980 | Carter | 307/247 |
| 4,247,791 | 1/1981 | Rovell | 307/355 |
| 4,397,001 | 8/1983 | Takemae | 365/189 |
| 4,407,016 | 9/1983 | Bayliss et al. | 364/200 |
| 4,424,563 | 1/1984 | Lynch | 364/200 |
| 4,455,627 | 6/1984 | Oritani | 365/226 |
| 4,500,988 | 2/1985 | Bennett et al. | 370/85 |
| 4,551,821 | 11/1985 | Yokouchi et al. | |

FOREIGN PATENT DOCUMENTS 2121254 3/1986 United Kingdom .

Primary Examiner—Thomas M. Heckler
Assistant Examiner—Randy Lacasse
Attorney, Agent, or Firm—Wenderoth, Lind & Ponack

[57] ABSTRACT

A data bus discharging circuit capable of enabling the high-speed operation of a microprocessor, includes a control signal generating circuit which provides control signals, a precharge/enable signal generating circuit which provides a precharge control signal and an enable signal, a discharge detecting circuit which detects small changes in the potential of the bit lines of the data bus, and a discharging circuit which sets the bit lines of the data bus selectively at a ground potential in response to the discharge detecting circuit.

6 Claims, 7 Drawing Figures

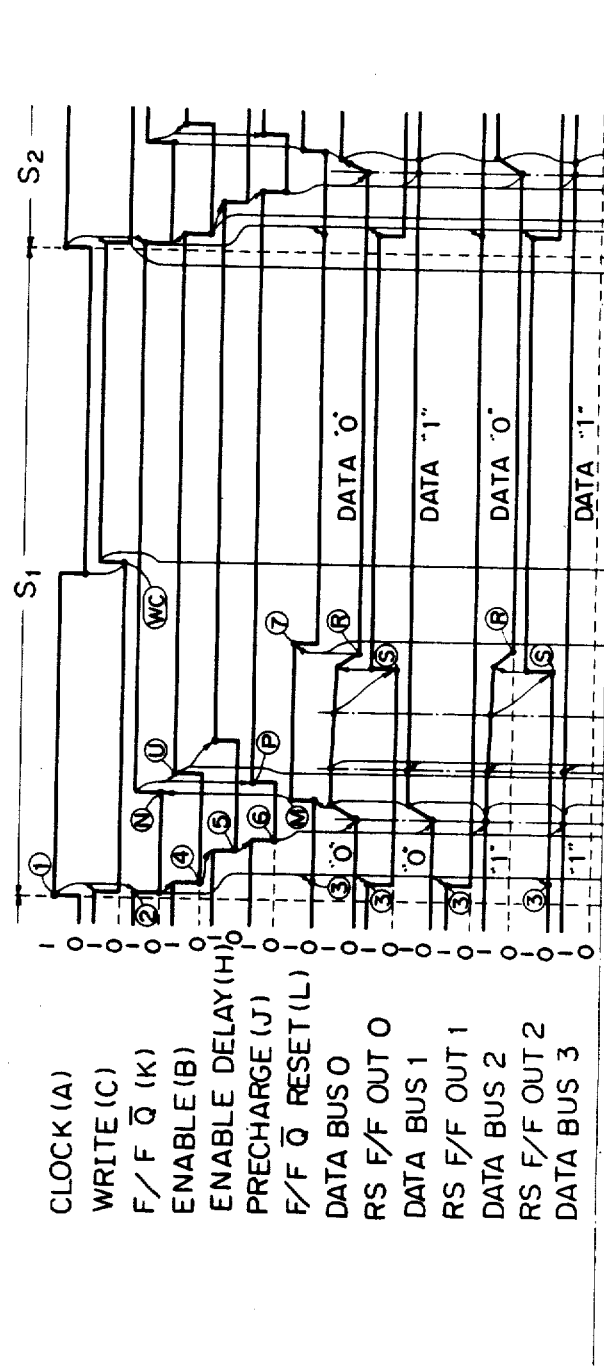

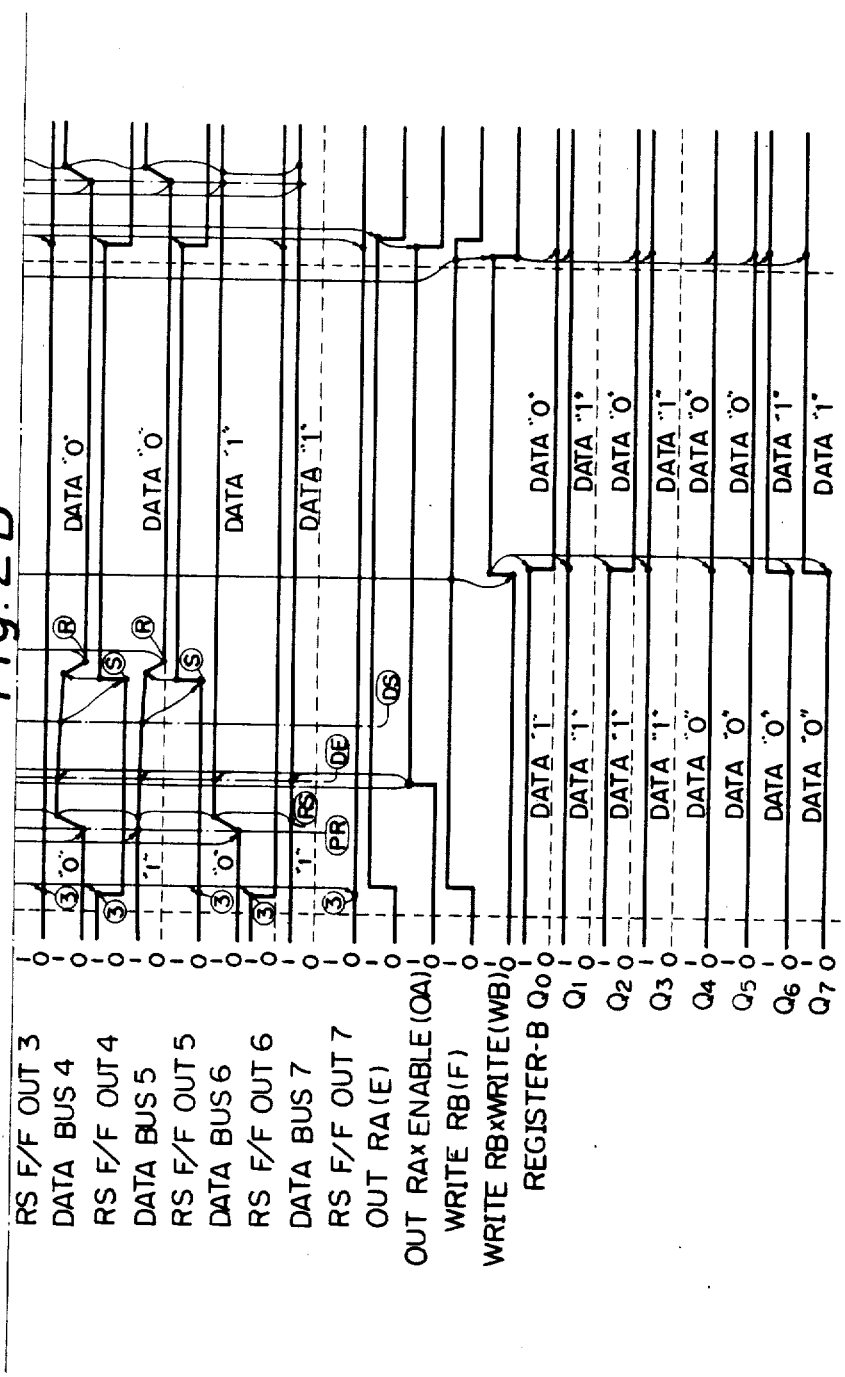

DATA BUS DISCHARGING CIRCUIT

BACKGROUND OF THE INVENTION

1. Field of the Invention

The present invention relates to a discharging circuit and, more particularly, to a data bus discharging circuit capable of enabling high-speed operation of microprocessors and microcomputers.

2. Description of the Prior Art

It is a general practice so far to initialize all the bit lines of the internal data bus of a MOS circuit device, such as a MOS microprocessor or a MOS microcomputer, at the level of the power source potential $V_{DD}$ (logic "1") immediately before starting data transfer, for the high-speed transfer of the data accumulated in the internal register of the MOS circuit device to the data bus.

An improved data bus precharging circuit for the high-speed initialization of a data bus is disclosed, for example, in Japanese Unexamined Patent Publication No. 58-186827 by the inventors of the present invention.

However, in transferring the data of a logic "0" stored in the internal register to the bit lines of the data bus set at the level of the power source potential, reducing the potential of the bit lines to the ground potential (logic "0") requires a considerably long time, for example, 50 to 60 ns, due to the parasitic capacitance of the bit lines.

Accordingly, it has been extremely difficult to operate a microprocessor IC at a high speed with clock signals of 15 MHz or above.

The enhancement of the output driving capability of thirty to forty registers may make it possible to solve such a problem; however, such means requires microprocessor IC chips having a large area, which disadvantageously increases the manufacturing cost.

SUMMARY OF THE INVENTION

Accordingly, it is an object of the present invention to provide a data bus discharging circuit capable of enabling the high-speed operation of a MOS circuit device including an internal data bus.

It is another object of the present invention to provide a data bus discharging circuit capable of enabling the high-speed operation of a MOS microprocessor IC without requiring an IC chip having a large area.

It is a further object of the present invention to provide a data bus discharging circuit capable of enabling a microprocessor to operate at a clock frequency of 20 MHz or above.

It is still further object of the present invention to provide a microprocessor IC including a data bus discharging circuit and capable of enabling one state having a period of 50 ns or below to be operated by one clock signal.

A data bus discharging circuit according to the present invention comprises:

a control signal generating circuit which provides a control signal of a logic "1" when all the bit lines of the data bus are set at a level of a logic "1", and provides a control signal of a logic "0" upon the reception of a clock signal;

a precharge/enable signal generating circuit which generates a precharge control signal for charging the data bus when the control signal is a logic "1", and generates an enable signal for actuating an internal gate circuit when the control signal is a logic "0";

a discharge detection circuit connected to the bit lines of the data bus, which provides a discharge control signal when the potention of the bit lines drops below a set level, and which is reset when the output control signal of the control signal generating circuit is a logic "0"; and a discharging means, which is connected to the bit lines of the data bus, and which sets the bit lines at the ground potential when the discharge detection circuit provides a discharge control signal.

The above and other objects, features and advantages of the invention will be more apparent from the following detailed description thereof taken in conjunction with the accompanying drawings.

BRIEF DESCRIPTION OF THE DRAWINGS

FIG. 2, including FIGS. 2A-2B, comprise is a timing chart showing a series of operation of the microprocessor of FIG. 1 in the data bus discharging mode.

DESCRIPTION OF THE PREFERRED EMBODIMENT

Figure 1A:
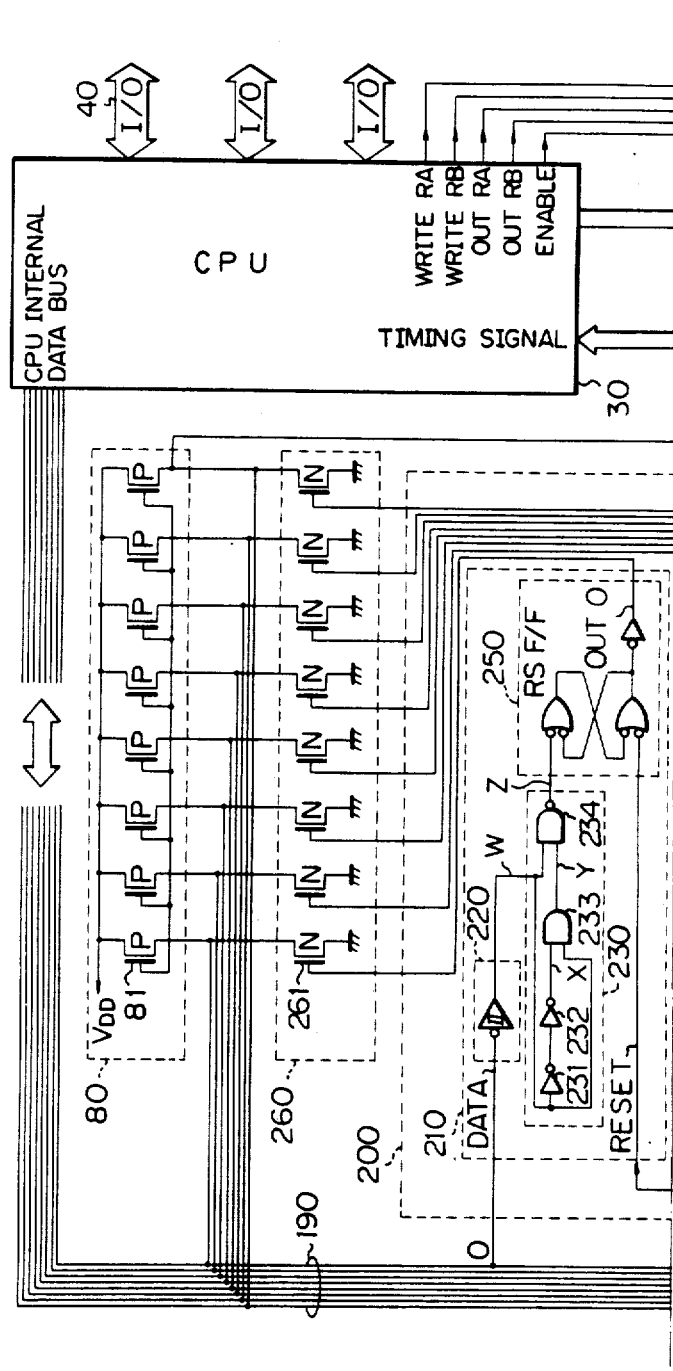
FIG. 1, including FIGS. 1A-1C, comprise a circuit diagram of a microprocessor including a data bus discharging circuit embodying the present invention.
Figure 1B:
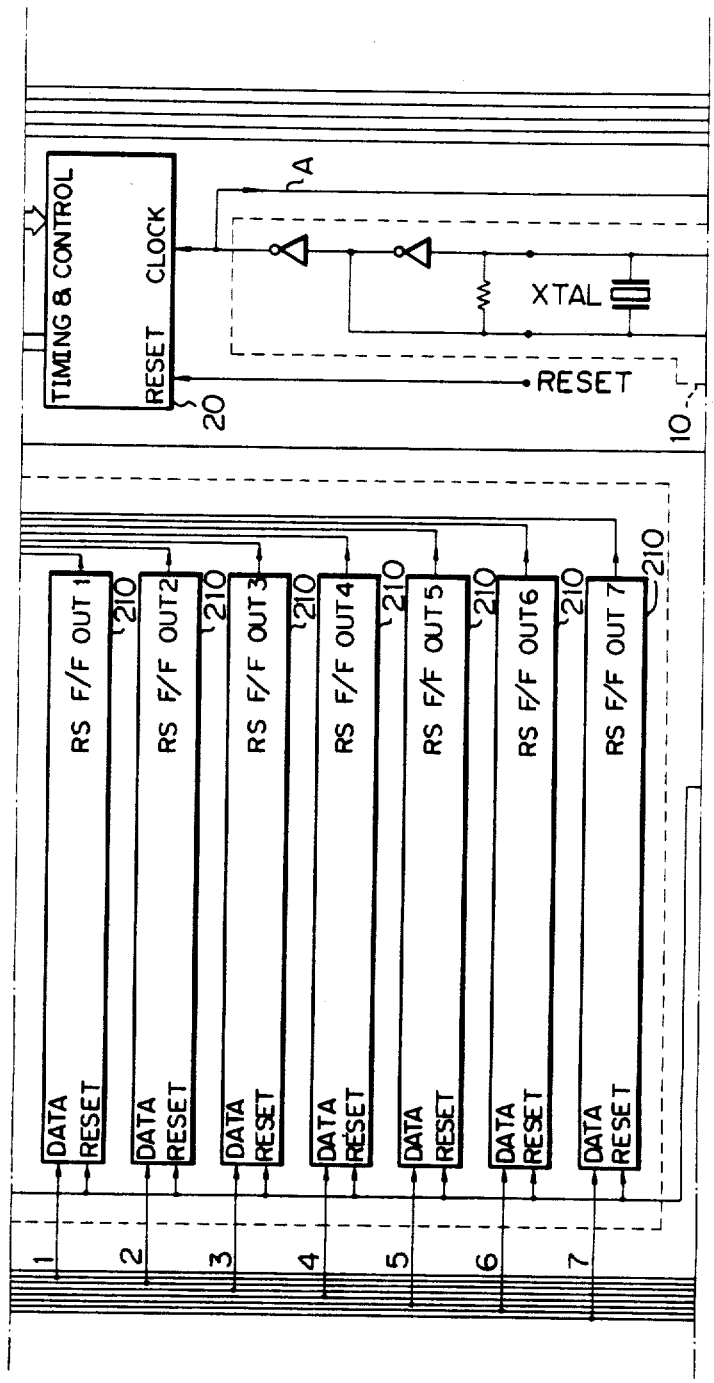
Figure 1C:
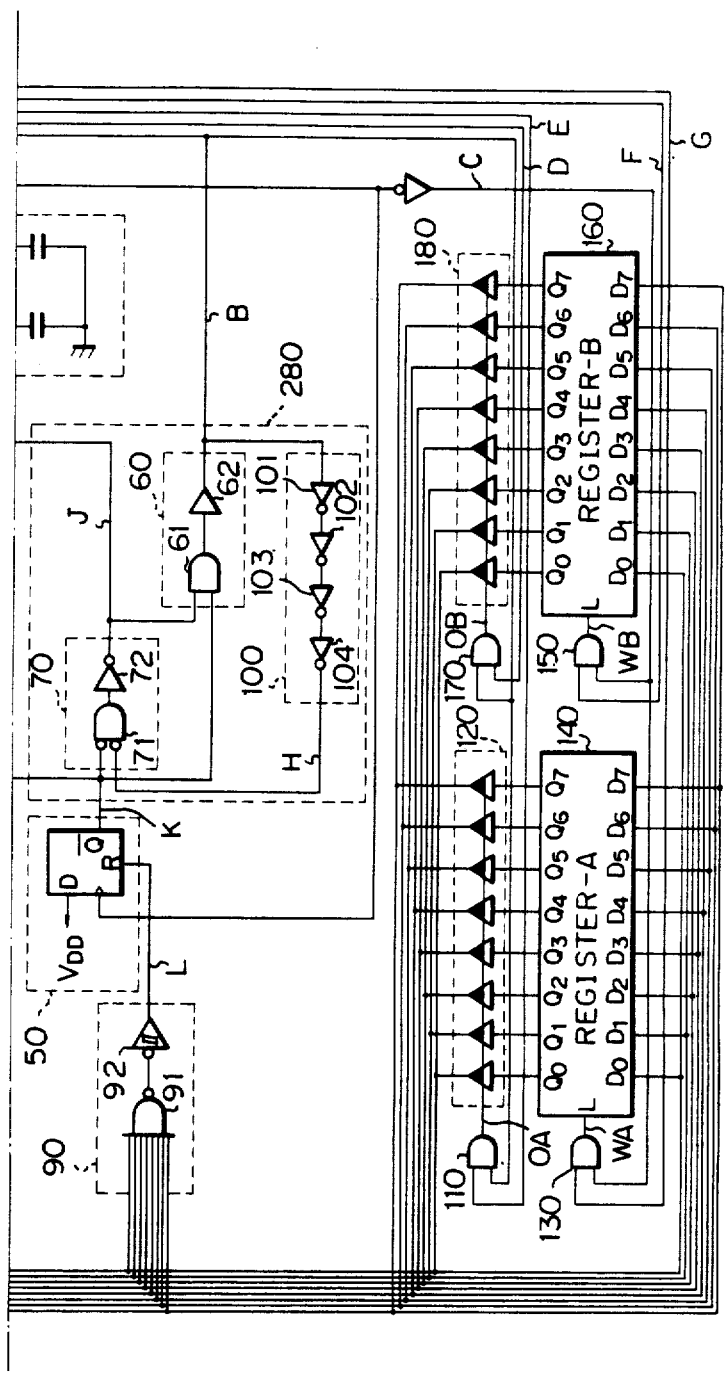

FIG. 1 shows an 8-bit microprocessor including a data bus discharging circuit according to the present invention.

Referring to FIG. 1, the microprocessor comprises a quartz-crystal oscillator circuit 10 which generates a reference clock signal A, a timing/control circuit 20 which is controlled by the reference clock signal A and a reset signal, and which generates a control timing signal, and a processing unit 30 which is connected to an internal data bus 190 and which decodes commands on the basis of a timing signal and an enable signal to control the internal circuits. The processing unit 30 comprises an ALU, a RAM and registers and is connected through I/O ports to external circuits.

The microprocessor further includes data registers 140 and 160 for the temporary storage of the data of the data bus 190, and gate circuits 120 and 180 for transferring the data stored in the data registers to the data bus 190.

When a write signal G (WRITE RA) and an inversion signal C of the clock signal A are fed from the processing unit 30 to an AND circuit 130, the data of the data bus 190 is stored in the data register 140.

When the processing unit 30 feeds an output command signal E (OUT RA) and an enable signal B to an AND circuit 110, the gate circuit 120 transfers the data stored in the data register 140 to the data bus 190. When the processing unit 30 feeds a write signal F (WRITE RB) and the inversion signal C of the clock signal A to an AND circuit 150, the data of the data bus 190 is stored in the data register 160.

When the processing unit 30 feeds an output command signal D (OUT RB) and the enable signal B to an AND circuit 170, the data stored in the register 160 is transferred through the gate circuit 180 to the data bus 190.

The microprocessor further includes a data bus precharging circuit for forcibly charging all the bit lines of the data bus 190 to a power source potential $V_{DD}$ at the initial state, and a data bus discharging circuit for forcibly causing bit lines having data of a logic "0" from among the data fed to the data bus 190, to discharge to the ground potential.

The data bus precharging circuit comprises a precharge detection circuit 90 which provides an output signal of a logic "1" when all the bit lines of the data bus 190 become a logic "1", a control signal generating circuit 50 which provides a control signal K of a logic "0" upon the reception of the clock signal A and provides a control signal K of a logic "1" when a precharge detection signal L fed by the precharge detection circuit 90 is a logic "1", and precharging means 80 which charges all the bit lines of the data bus 190 to the power source potential $V_{DD}$ upon the reception of a precharge control signal J.

The precharge detection circuit 90 comprises, for example, a NAND circuit 91 and an inverter 92 having Schmitt trigger circuit characteristics.

The control signal generating circuit 50 is, for example, a data type flip flop circuit.

The precharging means 80 comprises a plurality of p-type MOSFETs 81.

The data bus discharging circuit comprises a unit 200 including a plurality of discharge detection circuits 210 connected to the bit lines of the data bus 190, respectively, discharging means 260 which forcibly set the bit lines tending to become a logic "0" at the ground potential, and a precharge/enable signal generating circuit 280 which provides the precharge control signal J or the enable signal B according to the logical level of the control signal K provided by the control signal generating circuit 50. The discharging means may preferably comprise a plurality of N-type MOSFETs 261.

The output signal of the discharge detection circuit 210 becomes a logic "1" when the level of the bit lines of the data bus 190 is a logic "0", or becomes a logic "0" when a reset signal (control signal K) of a logic "0" is fed thereto. The discharge detection circuit 210 comprises a detection circuit 220 which provides a detection signal W of a logic "1" upon the detection of the bit line being a logic "0", a filter circuit 230 which allows only the detection signals Z having a width not less than a predetermined width, for example, 5 ns, to pass, and a signal holding circuit 250 which provides a discharge control signal of a logic "1" when the detection signal Z is a logic "0", and provides a discharge control signal of a logic "0" when a reset signal of a logic "0" is fed thereto.

The detection circuit 220 is, for example, an inverter having Schmitt trigger circuit characteristics.

The filter circuit 230 comprises, for example, inverters 231 and 232, and AND circuit 233 and a NAND circuit 234.

The signal holding circuit 250 is, for example, an RS type flip flop circuit.

The charge/enable signal generating circuit 280 comprises a precharge control signal generating circuit 70 which provides the precharge control signal J of a logic "0" for switching on the p-type MOSFETs 81 of the precharging means 80 when the output signal K is a logic "0" and a delayed enable signal H is a logic "0", an enable signal generating circuit 60 which provides the enable signal B for transferring the contents of the registers to the data bus 190 upon the reception of the precharge control signal J of a logic "1" and the control signal K of a logic "1", and a delaying circuit 100 which delays the enable signal B in order to inhibit the simultaneous execution of data bus precharging and data bus discharging.

The precharge control signal generating circuit 70 comprises, for example, a NOR circuit 71 and an inverter 72.

The enable signal generating circuit 60 comprises, for example, and AND circuit 61 and a buffer circuit 62.

The delaying circuit 100 comprises, for example, inverters 101, 102, 103 and 104.

The operation of the data bus discharging circuit of the present invention will be described in connection with the timing chart of FIG. 2.

If the quartz-crystal oscillator circuit 10 provides a reference clock signal A of a frequency of 20 MHz and a period of 50ns and one state is established for one clock pulse, 8-bit data 10101 1100 (ACH) is fed to the data bus 190, and 8-bit data 00001111 (OFH) is sorted in the register B 160, the register output control signal E (OUT RA) is a logic "1", the register write signal F (WRITE RB) is a logic "1", and 8-bit data 11001010 (CAH) is stored in the register A 140.

Data Bus Precharging:

First, in a state $S_1$, upon the change of the clock signal A from a logic "0" to a logic "1", the control signal K of the control signal generating circuit 50 changes from a logic "1" to a logic "0" and the enable signal B of the enable signal generating circuit 60 becomes a logic "0" (FIG. 2A: 1, 2, 4).

Since the reset signal of the logic "0" data detecting circuit 200 becomes a logic "0" when the control signal K becomes a logic "0", all the RS flip flops of the discharge signal generating circuit 210 are reset and all of the output signals (OUT 0 to 7) thereof become a logic "0" (FIGS. 2A–2B 3).

Simultaneously, the control signal K of a logic "0" is fed to the AND circuit 61, whereby the enable signal B becomes a logic "0", so that the gate circuits 120 and 180 interrupt the output operation of the microprocessor (FIG. 2A; 4).

The control signal K of a logic "0" is delayed, for example, by 10ns, by the delaying circuit 100, and then the delayed control signal K is fed to the NOR circuit 71. When the input signals K and H both become a logic "0", the NOR circuit 71 provides the precharge control signal J of a logic "0" (FIG. 2A: 6).

Consequently, all the p-type MOSFETs 81 of the precharging means 80 are switched on and all the bit lines of the data bus 190 are charged forcibly and quickly to the power source potention $V_{DD}$ (logic "1"), for example, 5V (FIGS. 2A–2B: PR).

During the above-mentioned process, all the output signals OUT 0 to 7 of the discharge control signal generating circuit 210 of the logic "0" data detecting circuit 200 are a logic "0".

Then, when all the bit lines of the data bus 190 become a logic "1", the output signal L of the precharge detecting circuit 90 changes from a logic "0" to a logic "1", while the output signal K of the flip flop circuit 50 is changed from a logic "0" to a logic "1" (FIGS. 2A–2B: M, N, RS).

Consequently, the output signal J of the control signal generating circuit 70 changes from a logic "0" to a logic "1" and the p-type MOSFETs 81 are switched off to complete the precharging operation (FIG. 2A: P).

Data Bus Descharging:

Upon the completion of the data bus precharging operation, both the output signal K of the control signal generating circuit 50 and the output signal J of the precharge control signal generating circuit 70 becomes a logic "1", therefore, the enable signal B of the enable signal generating circuit 60 changes from a logic "0" to a logic "1" (FIG. 2A: U ).

The AND circuit 110 opens the gate circuit 120 to transfer the data 11001010 stored in the register A 140 to the data bus 190.

When data of a logic "0" is fed to the data bus 190, the potential of the bit lines starts dropping from the power source potential $V_{DD}$ (logic "1") (FIG. 2B: DE ).

The drop of the potential of the bit lines is detected by the logic "0" data detecting circuit 200. Upon the drop of the potential of the bit lines below a predetermined potential, for example, 4V, the output signal of the RS flip flop circuit 250 changes from a logic "0" to a logic "1" (FIGS. 2A-2B: DS, S ).

Accordingly, the n-type MOSFETs 261 which are connected to the bit lines and received the data of a logic "0" are switched on to make the bit lines discharge forcibly to the ground potential (FIGS. 2A-2B: R ). Ordinarily, it takes 50 to 60 ns to change the bit line from a logic "1" to a logic "0". However, the additional employment of the data bus discharging circuit of the present invention reduces the time necessary for changing the bit line from a logic "1" to a logic "0" to approximately 5 to 10 ns.

The contents of the register A 140 11001010 (CAH) is fed to the data bus 190.

Data Writing:

The change of the clock signal A from a logic "1" to a logic "0" causes the inverted signal C of the clock signal A to become a logic "1" (FIG. 2A: WC )

The output signal WB of the AND circuit 150 becomes a logic "1" and the contents 11001010 (CAH) of the data bus 190 are stored in the register B 160.

Then, in a state $S_2$, when the clock signal A changes from a logic "0" to a logic "1", the control signal K becomes a logic "0" to reset the output of the RS flip flop 250 of the discharge detecting circuit 210 to a logic "0" and makes the enable signal B a logic "0".

Then, the data bus precharging operation is restarted.

As apparent from the foregoing description, the data bus discharging circuit of the present invention is capable of reducing the time necessary for feeding data of a logic "0" to the data bus without requiring enhanced register output driving capacity.

Furthermore, the data discharging circuit of the present invention enables the high-speed operation and the reduction of power consumption of microprocessors and microcomputers, particularly, those of the CMOS type.

What is claimed is:

1. A data bus discharging circuit for selectively discharging bit lines of a data bus after all of said bit lines of said data bus have been precharged to or near a power supply voltage, said data bus discharging circuit comprising:

(a) a plurality of discharge detection circuits, each of which is respectively connected to one of said plurality bit lines of said data bus for detecting a small voltage change on a corresponding bit line which is to be charged to or near a ground voltage immediately after data is loaded into said data bus, all of said plurality of bit lines having been initially precharged to or near said power supply voltage in a data output operation, and for then providing a discharge control signal;

(b) a plurality of discharging means each of which is respectively connected between one of said plurality of discharge detection circuits and its corresponding bit line for quickly reducing the voltage thereon to or near said ground voltage on receipt of said respective discharge control signal; and (c) a controlc circuit connected to each of said plurality of discharge detection circuits for providing said control signal to said discharge detection circuit in said data output operation; whereby data can be loaded into said data bus at a high speed at an earlier stage of said data output operation.

2. A data bus discharging circuit according to claim 1, wherein each of said discharging means comprises a MOS FET having a gate connected to an output of said discharge detection circuit, and having a source connected to a bit line of said data bus, and having a drain connected to a point at said ground voltage.

3. A data discharging circuit according to claim 1, wherein said discharge detection circuit comprises a detection circuit which provides a detection signal when a potential of its respective bit line drops below a predetermined value, a filter circuit which allows said detection signal to pass when said detection signal has at least a predetermined time width, and a signal holding circuit which selectively provides said discharge control signal to said discharging means in response to said detection signal from said filter circuit.

4. A data bus discharging circuit according to claim 3, wherein said detection circuit comprises an inverter having Schmitt trigger characteristics.

5. A data bus discharging circuit according to claim 3, wherein said filter circuit comprises an inverter, and AND circuit, and a NAND circuit.

6. A data bus discharging circuit according to claim 3, wherein said signal holding circuit comprises an RS type flip flop circuit.

* * * * *